United States Patent [19]
Chatterjee et al.

[11] Patent Number: 5,965,092
[45] Date of Patent: *Oct. 12, 1999

[54] INTEGRATED MICRO-CERAMIC CHEMICAL PLANT WITH INSERTABLE MICRO-FILTERS

[75] Inventors: Dilip K. Chatterjee; Syamal K. Ghosh, both of Rochester; Edward P. Furlani, Lancaster, all of N.Y.

[73] Assignee: Eastman Kodak Company, Rochester, N.Y.

[*] Notice: This patent is subject to a terminal disclaimer.

[21] Appl. No.: 08/951,181

[22] Filed: Oct. 15, 1997

[51] Int. Cl.⁶ ....................................................... B01J 19/00
[52] U.S. Cl. .......................... 422/130; 422/101; 422/239; 422/240; 422/216
[58] Field of Search ................................. 422/58, 60, 70, 422/130, 136, 191, 236, 216, 239, 240, 291, 101; 210/619, 634, 641, 650, 653, 205

[56] References Cited

U.S. PATENT DOCUMENTS

| | | | |
|---|---|---|---|
| 5,480,614 | 1/1996 | Kamahori | 422/70 |
| 5,534,328 | 7/1996 | Ashmead et al. | 428/166 |
| 5,658,537 | 8/1997 | Dugan | 422/191 |
| 5,863,502 | 1/1999 | Southgate et al. | 422/58 |
| 5,869,004 | 2/1999 | Parce et al. | 422/100 |

Primary Examiner—Hien Tran
Assistant Examiner—James Kennedy
Attorney, Agent, or Firm—Raymond L. Owens

[57] ABSTRACT

An integrated micro-ceramic chemical plant having a unitary ceramic body formed from multiple ceramic layers in the "green" state which are sintered together includes the unitary ceramic body defining a reaction chamber and a first passage for providing communication with the catalytic reaction chamber so that two or more fluids may be delivered to such reaction chamber for reaction; the unitary ceramic body defining a receiving chamber connected to the reaction chamber. The integrated micro-ceramic chemical plant further includes a movable member insertable into the receiving chamber and having a plurality of micro-filters for separating the reaction products so as to retrieve desired reaction products; and the movable member is moved to a position where one of the micro filters is in communication with the reaction chamber for separating the reaction products.

8 Claims, 10 Drawing Sheets

INTEGRATED MICRO-CERAMIC CHEMICAL PLANT WITH INSERTABLE MICRO-FILTERS

CROSS REFERENCE TO RELATED APPLICATIONS

Reference is made to commonly assigned U.S. patent application Ser. No. 08/835,979, filed Apr. 11, 1997, entitled "Integrated Ceramic Micro-Chemical Plant" by Ghosh et al; U.S. patent application Ser. No. 08/879,345, filed Jun. 20, 1997, entitled "Reaction Chamber for an Integrated Micro-Ceramic Chemical Plant" by Ghosh et al, U.S. patent application Ser. No. 08/898,097 filed Jul. 22, 1997, entitled "Micro-Ceramic Chemical Plant Having Catalytic Reaction Chamber" by Chatterjee et al, U.S. patent application Ser. No. 08/951,180, filed Oct. 15, 1997, "Integrated Micro-Ceramic Chemical Plant With Insertable Catalytic Reaction Chambers" by Chatterjee et al, and U.S. patent application Ser. No. 08/951,179, filed Oct. 15, 1997, filed concurrently herewith, entitled "Integrated Micro-Ceramic Chemical Plant With Insertable Reaction Chambers and Micro-Filters" by Chatterjee et al, the teachings of which are incorporated herein.

FIELD OF THE INVENTION

The present invention relates to an integrated micro-ceramic chemical plant and to improved reaction and micro-filtering used in producing and separating such chemicals and products of chemical reactions.

BACKGROUND OF THE INVENTION

Micro-engineering is a rapidly growing field which is liable to impact on many applications over the coming years. Three-dimensional micro-engineered devices and systems involving silicon planar technology can be produced with features from one to a few hundred microns having tolerances in micron or as small as submicron level. Most of the current micro-engineering technologies are evolved from the adaptation of thin films, photolithographic and etching technologies generally applied to silicon wafers on which silicon monoxide, silicon dioxide, silicon nitride and the like thin films are deposited and etched thereafter yielding planar configurations.

Advances have been made to study chemical processes based on microfluidic systems technology using planar structures on silicon chips. Predictive flow modeling has also been developed to realize the benefits from the microfluidic technology.

The performance of chemical processing is strictly governed by the mass transport and sometimes thermal transport properties of the system. It is therefore essential to understand how miniaturization affects the chemical processes. Laminar flow of an ideal fluid in a tube or channel is well characterized. Pfahler et al (J. Pfahler, J. Harley, H. Bau and J. Zemel; sensors and Actuators; Vol. 21–23 (1990); page 431–434) have demonstrated in an experiment using channels of various geometry on silicon wafers that there is an agreement between experiment and theory concluding that the conventional Hagen-Poiseuille equation is obeyed down to a scale of few microns. Laminar volume flow per unit time, $Q_f$, of an ideal fluid in a circular pipe is described by the Hagen-Poiseuille equation:

$$Q_f = \frac{\pi}{8\mu_f} \cdot \frac{dp}{dx} r^4$$

where $\mu_f$ and r are the fluid viscosity and tube radius respectively, dp/dx is the pressure gradient along the x-direction of flow.

As the channel widths are reduced, the fluid flow becomes more laminar which provides control over the distribution of material and that dictates that fluid mixing is achieved by diffusion or other molecular migration processes rather than by turbulence. This problem of mixing can be solved by commercially available software packages on computational fluid dynamics. A measure of degree of mixing, F, can be estimated from the expression $F=Dt/l^2$, where D is a reactant diffusion constant, t is contact time allowed for mixing and l is distance across a reactant stream. Quantitatively, mixing may be defined as substantial to nearly complete for F values from 0.1 to 1. Typically, near complete mixing of two fluids in 1 second corresponds to channel widths of 100 $\mu$m.

Similarly, problems exist with respect to heat transfer in micro-channels under laminar flow conditions. Understanding of this laminar heat flow process can be useful in designing and building micro heat exchangers and chemical micro-reactors.

The current planar silicon technologies are inadequate for the fabrication of an integrated and self-contained catalytic reaction and micro-filtering arrangement.

SUMMARY OF THE INVENTION

It is an object of the present invention to provide an improved integrated micro-ceramic chemical plant with improved micro-filtering chambers.

This object is achieved in an integrated micro-ceramic chemical plant having a unitary ceramic body formed from multiple ceramic layers in the "green" state which are sintered together comprising:

(a) the unitary ceramic body defining a reaction chamber and first passage means for providing communication with the catalytic reaction chamber so that two or more fluids may be delivered to such reaction chamber for reaction;

(b) the unitary ceramic body defining a receiving chamber connected to the reaction chamber;

(c) a movable member insertable into the receiving chamber and having a plurality of micro- filters for separating the reaction products so as to retrieve desired reaction products; and (d) means for moving the movable member to a position where one of the micro filters is in communication with the reaction chamber for separating the reaction products.

It is a feature of the present invention that a movable member with micro-filters can be movable into a reaction position in a integrated micro-ceramic chemical plant to provide improved filtering.

It is a feature of the present invention that integrated micro-ceramic chemical plants can be fabricated using micromolded ceramic technology with the incorporation of micro-porous ceramic materials in which the mixing, chemical reactions, preferably catalytic reactions of chemicals and separation of fluid chemicals from solid products can be done in a highly effective manner.

In micromolded ceramic technology features as small as one hundred microns or up to a millimeter size can be molded with a die onto the surfaces of softer "green" ceramic and ceramic composite bodies and sintered to have harder and denser bodies with those microfeatures embedded on them. The manufacturing advantages of this technology include: a plurality of micro-features can be incorporated in the "green" ceramic in one manufacturing step; layer by layer of micro-features can be built up and from this, a unitary body can be built up in a single sintering step. Another important feature of micromolded ceramic technology is that since the "green" ceramic bodies shrink during sintering operations, the features replicated in the "green" ceramic bodies reduce in size at the final step of the manufacturing processes.

The catalyst assisted reactions and the reaction products in integrated ceramic chemical plants in accordance with the present invention can be efficiently managed, separated and classified if the reaction area can be minimized.

The improved catalytic reaction chamber and micro-filtering system in the integrated micro-ceramic chemical plant has a number of advantages:

a) by reducing the dimensions of the systems it is possible to ensure good mixing in a short time without the need to introduce turbulence. For those chemicals which require turbulent mixing they can also be incorporated in the integrated micro-ceramic chemical plant and, if desired, turbulence is caused from external stimulus such as vibration;

b) indirect chemical reaction by osmosis process is made possible by providing semi- or permeable wall to effectively control the chemical reactions;

c) more efficient thermal control is possible because of the large surface to volume ratio. Since relatively small quantities of chemicals are used in the micro-channels at any given time, the risk of chemical explosion or the occurrence of highly exothermic reaction is also reduced. It is also possible to shut down the chemical reaction very quickly;

d) ceramic and ceramic composite materials, in general, are chemically inert and, therefore, are resistant to corrosion;

e) cleaning of the catalytic reaction chamber, catalytic reaction beds, micro-filters, passage tubes, inlet and outlet holes, etc. is much more efficient because they can be cleaned using acidic or caustic solutions as desired;

f) most ceramic and ceramic composite materials are more thermally stable than silicon;

g) ceramic and ceramic composite materials possess high strength, high hardness, and in some instances high fracture toughness, rendering them durable and wear resistant;

h) the use of movable disk members with micro-filters of different species of micro-pores and also with catalytic reaction beds containing different species of catalysts and integrated micro-ceramic chemical plants facilitates improved processing of the integrated micro-ceramic chemical plant.

BRIEF DESCRIPTION OF THE DRAWINGS

FIG. 3b is a partial magnified view of the second layer taken along the lines of A—A and B—B of FIG. 3a;

FIG. 5 is a perspective of a rotatable member that can have a plurality of micro-filters, micro-ceramic catalytic reaction beds or a combination there of;

FIG. 9b is another cross sectional perspective of the end cap taken along the lines A—A of FIG. 9a.

DETAILED DESCRIPTION OF THE PREFERRED EMBODIMENT

The rate of a chemical reaction can be increased by raising the temperature. However, this is not always feasible or practical. Some reactants and products decompose at high temperatures. From an economic standpoint, raising the temperature means increased energy costs. Fortunately, there are certain substances called catalysts that offer an alternative approach to speeding up a reaction. A catalyst increases the rate of reaction without being consumed by it. A catalyst operates by lowering activation energy for a chemical reaction.

A heterogeneous catalyst is one that is in a different phase from the reaction mixture. Most commonly, the catalyst will be a solid that increases the rate of a gas phase or fluid phase reaction.

A homogeneous catalyst is one that is present in the same phase as the reactants. It speeds up the reaction by forming a reactive intermediate that decomposes to give products. In this way, the catalyst provides an alternative path of lower activation energy for the reaction.

A properly designed catalyst should have the essential attributes of activity, stability, selectivity, and regenerability. These can be related to the physical and chemical properties of the catalyst, which in turn can be related to the variable parameters inherent in the method used for the preparation of the catalyst. In addition to a wide range of techniques for the preparation of supported catalysts a substantial number of supports are available for such systems.

The principal catalyst preparation technique involves two stages. First, laying a metal salt component into a finely divided form on a support, generally micro-porous ceramics and secondly, the conversion of the supported metal salt to a metallic or oxide state.

The first stage is known as dispersion and is achieved by impregnation, adsorption from solution, co-precipitation, or deposition. While the second stage is called calcination or reduction.

The primary aim of applying a catalytically active component to a support is to obtain the catalyst in a highly dispersed form and hence, in a highly active form when expressed as a function of the weight of the active component.

All the techniques of catalyst preparation reduce to two simple steps: dispersing the active material in a fluid or gaseous form and immobilizing this dispersed material as it is reconverted to an insoluble solid form.

Figure 1:
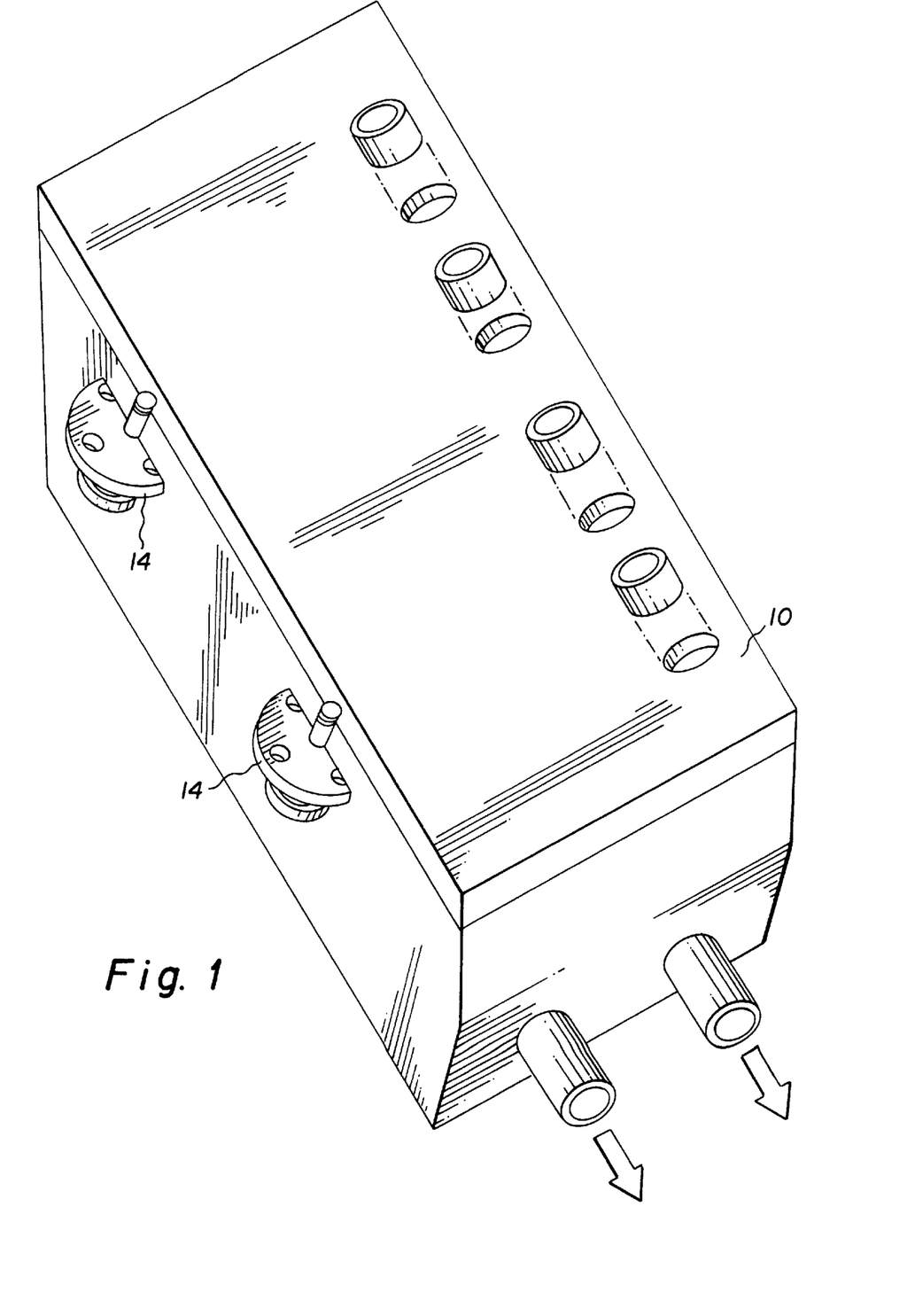
FIG. 1 is a perspective of an integrated micro-ceramic chemical plant in accordance with the present invention.

Referring to FIG. 1 a perspective is illustrated of an integrated micromolded unitary ceramic block 10 including three different layers. Two separate rotatable members 14 are shown to be partially insertable into receiving cavities formed in the second layer (see FIG. 3a). Each of these rotatable members 14 include a micro-filter (see FIG. 6c), a micro-ceramic catalytic reaction bed (see FIG. 6d) or a combination of a catalytic reaction bed and micro-filter (see FIG. 6e). These arrangements will be subsequently discussed in detail. It will be understood that as many rotatable members as are needed can be used.

Figure 2:
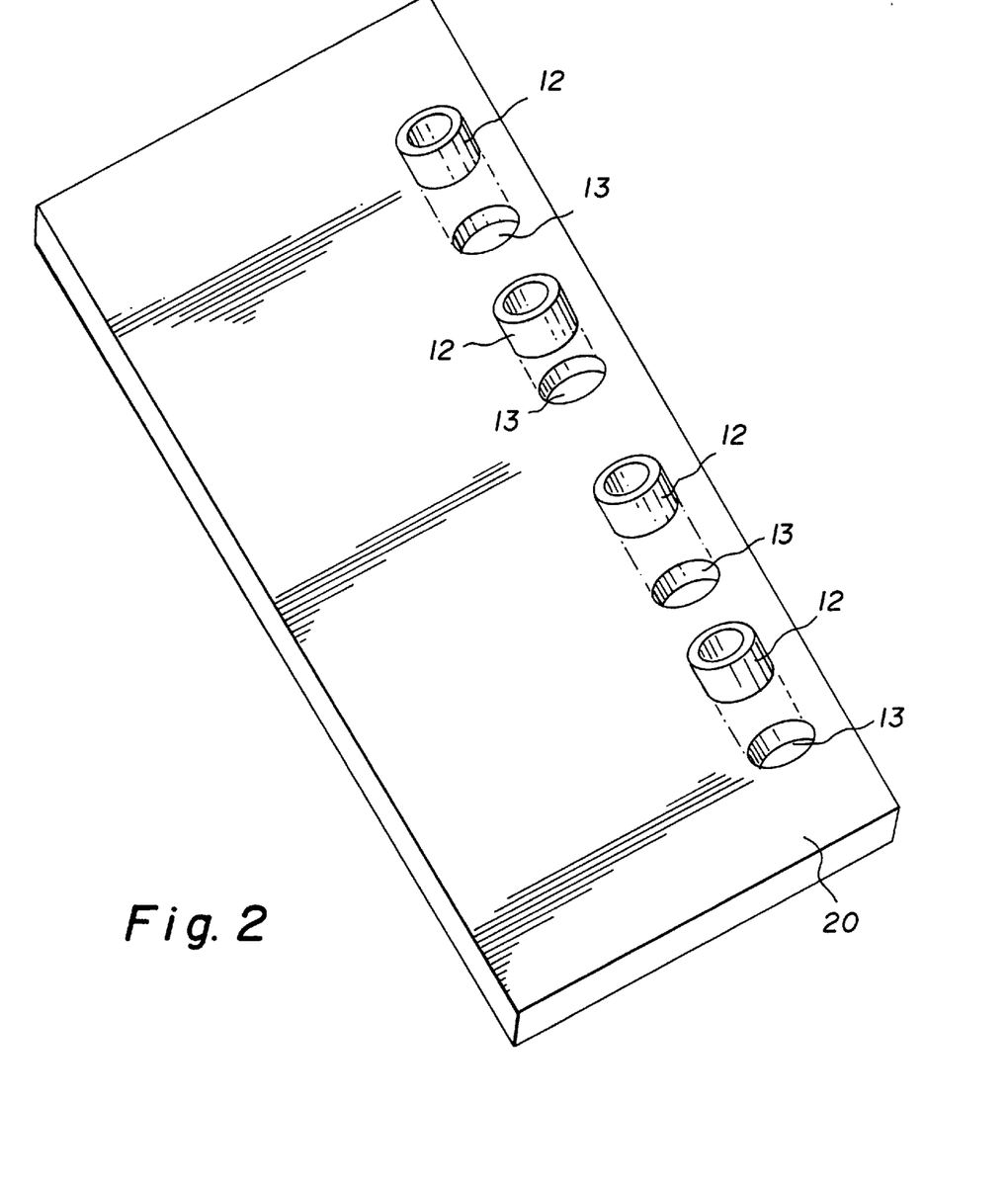
FIG. 2 is a perspective of the first layer of the integrated micro-ceramic chemical plant including the top portion showing the conduits for entry of the reactants to the plant.

FIG. 2 shows the first ceramic layer 20 of the unitary ceramic block which contains a row of chemical delivery inlet conduits 12 (which may be tubes) on one side. It is to be noted that the first ceramic layer 20 may include more than two conduits in a row. The conduits 12 lead directly to a second ceramic layer 30 through hole 13.

Figure 3A:
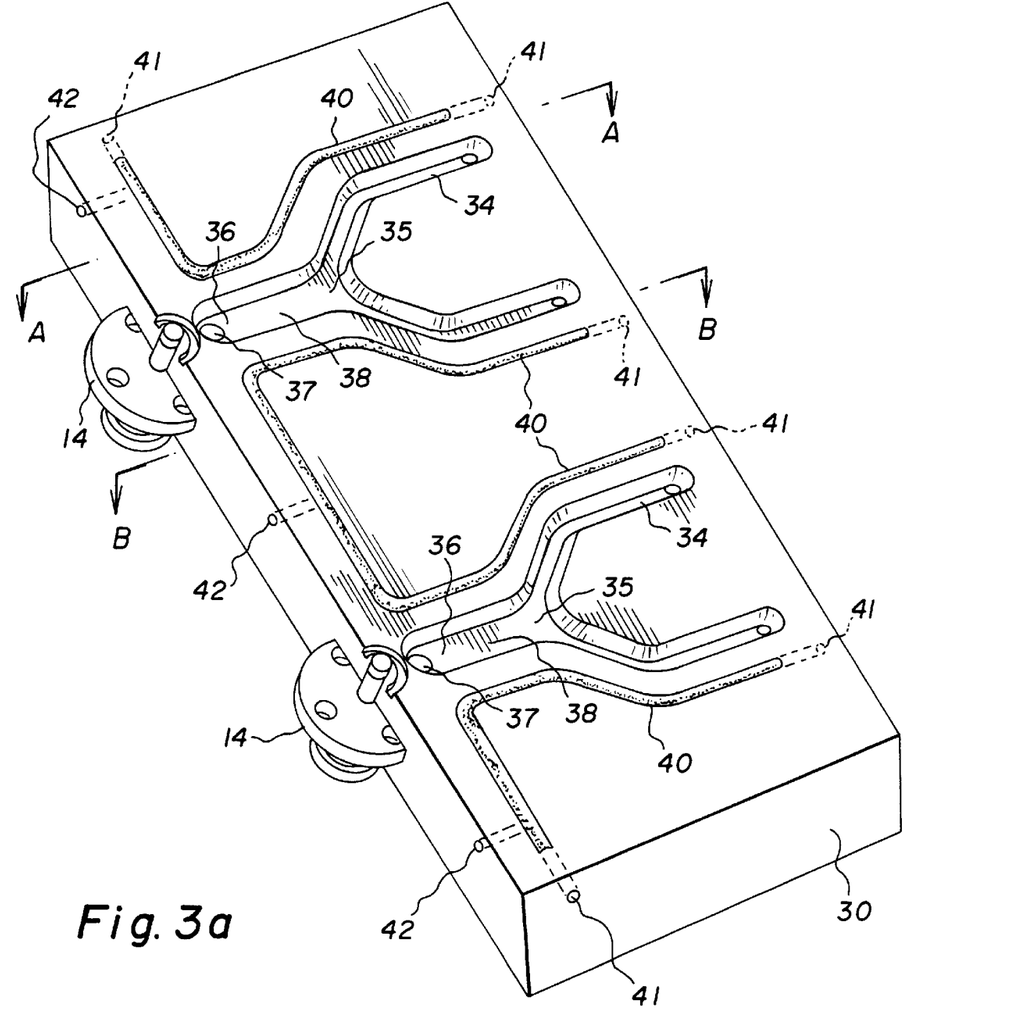
FIG. 3a is a perspective of the second layer from the top of the integrated micro-ceramic chemical plant showing the passages for chemical transport to the reaction chamber, heater arrangement.

FIG. 3a shows the second ceramic layer 30 which includes a chemical delivery chamber 34 and a chemical mixing chamber 35 in the form of micro-channels. One end of the chemical delivery chamber 34 is located under the through hole 13 of the first ceramic layer 20. More than two micro-channels can of course be used in accordance with the present invention. The second ceramic layer 30 has receiving chambers with holding tanks 36 and is formed with discharge holes 37 disposed in a chemical mixing chamber 35. It should be noted that when the rotatable member 14 includes only micro-filters then a catalytic reaction chamber 38 is formed in the second ceramic layer 30. In such a situation, it includes a permeable (semi-permeable) partition wall 39a which is made of a micro-porous and/or permeable ceramic material which permits the mixing of two different chemicals so that they can properly react as will be described later. It should also be noted that when the rotatable member 14 includes only a micro-ceramic catalytic reaction bed or a combination of a micro-ceramic catalytic reaction bed and a micro-filter, the area labeled by 38 in FIGS. 3a and 3b designates a reaction chamber only. When a rotatable member 14 is inserted underneath the receiving chamber with holding tank 36, it can be rotated to an appropriate position where one of the arrangements shown in FIGS. 6c–e is in direct communication either with reaction products or reaction fluids. More particularly, when the rotatable member 14 is inserted into the reaction chamber 38, one of a plurality of micro-filters 67 (see FIG. 6) separates the reaction products so as to retrieve desired reaction products. A motor 65 (see FIG. 5) rotates the rotatable member 14 to a position where one of the micro filters 67 is in communication with the reaction chamber 38 for separating the reaction products.

Figure 3B:
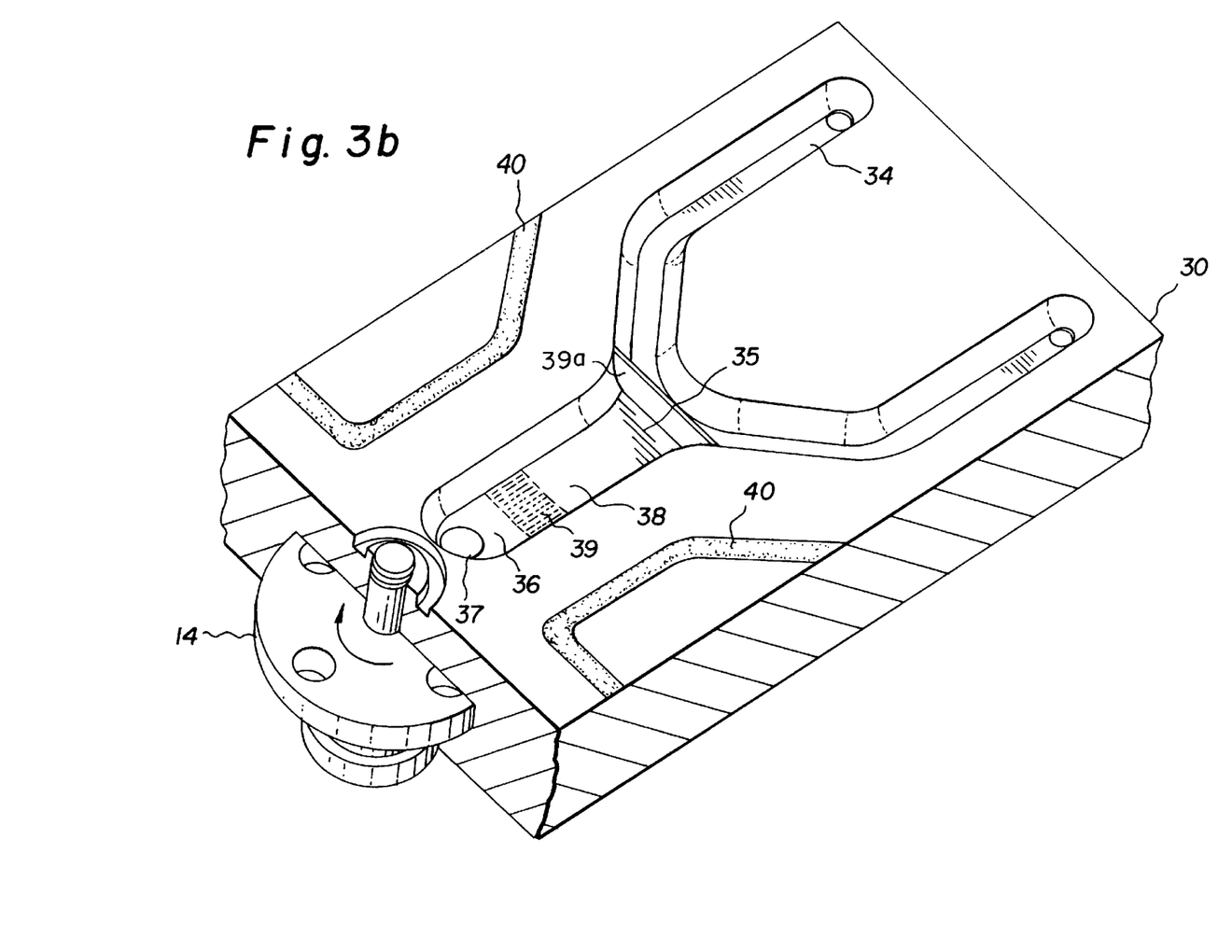

As best shown in FIG. 3b, (which is a magnified view of FIG. 3 between AA–BB) when the rotatable member 14 has only a micro-filter (see FIG. 6c) the second ceramic layer 30 also contains a catalytic reaction bed 39 to facilitate catalytic reactions. The catalytic reaction bed 39 which is made from micro-porous ceramics impregnated with catalysts. This impregnation can be accomplished during manufacture of the catalytic reaction bed 39 or during the final sintering step. The second ceramic layer 30 contains embedded heating elements 40 surrounding the reaction chamber 38 and a thermocouple (not shown) inserted in feedthrough 42 (see FIG. 3a) which monitors and applies a signal to a control system (not shown) for monitoring and controlling the temperature in the reaction chamber 38.

The permeable partition wall 39a is preferably made by dry pressing ceramic and its composite powders such as zirconia silicate, alumina silicate, zirconia, alumina, silicon carbide, silicon nitride and ceramic composites comprising zirconia—alumina at a pressure such that upon sintering the desired degree of porosity is maintained. It is very important that the pores need to be of the interconnecting variety. The permeable partition wall 39a can also be made alternatively by gel casting, tape casting and injection molding zirconia silicate or alumina silicate such that upon controlled sintering a varying degree of porosity is achieved. The permeable partition wall 39a permits controlled reaction between the chemicals in the fluids on either side of the permeable partition wall 39a to permit the mixing of such fluids during a reaction process. The ceramic powder is blended with polymeric fibers made of materials such as polyvinyl alcohol, polyethylene glycol or acrylic which upon sintering leaves behind interconnected micro-pores. The pore size or the diameter of the sacrificial organic fibers vary in a range from 0.1 to 10 $\mu$m because the degree of porosity (density) is warranted by the amount of permeability required for a given chemical process. In other words, custom tailored permeability can be incorporated by controlling the compacting pressure, diameter of the polymer fibers and sintering temperature for a given ceramic composition. The preferred way of making the "green" permeable partition wall containing sacrificial organic fibers such as polyvinyl alcohol, is to gel cast the ceramic mixture containing the organic binders and organic fibers in a mold and air drying the part to drive off the solvent. Upon compacting and subsequent firing the sacrificial organic fibers will produce a wall having a variable degree of porosity. The permeable partition wall 39a, which is in the "green" state, is then incorporated in the unitary ceramic "green" body before all the layers are assembled and sintered to form the sintered unitary micro-ceramic chemical plant. It is instructive to note that a plurality of channels can be provided to handle more than two chemicals or alternatively the catalytic reaction chamber 38 can be made longer by configuring serpentine, complex, wavy, winding and angular meandering forms to allow for longer reaction time. An embedded ceramic heating element 40 is provided in walls defining the perimeter of the chemical delivery chamber 34, the chemical mixing chamber 35, and the reaction/catalytic reaction chamber 38 to provide heat to these chambers. With certain chemical reactions it is particularly important to provide heat to the reaction/catalytic reaction chamber 38. The embedded heating element 40 can be made from ceramics such as $MoSi_2$, $TiB_2$, $ZrB_2$, $WO_3$ or high-temperature resistive metals or metallic alloys. The electrical leads 41 (see FIG. 3a) for the embedded heating element 40 are located at the side of the second ceramic layer 30 defining the perimeter of the chemical delivery, chemical mixing and reaction/catalytic reaction chambers 34, 35 and 38 respectively and is an integral part thereof. A feedthrough for a thermocouple 42 (see FIG. 3a) located close to the heating element and a thermocouple (not shown) can be inserted in the feedthrough 42 for both monitor and control of temperature of the reaction chamber.

In chemical reactions involving two or more fluid chemicals and more particularly, those requiring the help of catalysts, the reduction in channel widths for chemical flow and the reaction areas, particularly micro-ceramic catalytic reaction beds are important. In such cases, the fluid flow becomes near laminar which provides control over the distribution of material and dictates that fluid mixing by diffusion or other molecular migration processes rather than by turbulence. This also ensures proper and complete chemical reactions, particularly those requiring catalytic reactions.

The reaction/catalytic reaction chamber 38 leads to discharge holes 37 contained in the chemical receiving chamber with holding tank 36 which merges into the next layer which is third ceramic layer 100. The cross-section of the catalytic reaction/reaction chamber 38 is configured as a rectangle but can be of other shapes such as oval, circular, triangular or any other convenient cross-section. The discharge holes 37 are directly connected to receiving chambers 60 in the third ceramic layer 100 (see FIG. 4).

Figure 4:
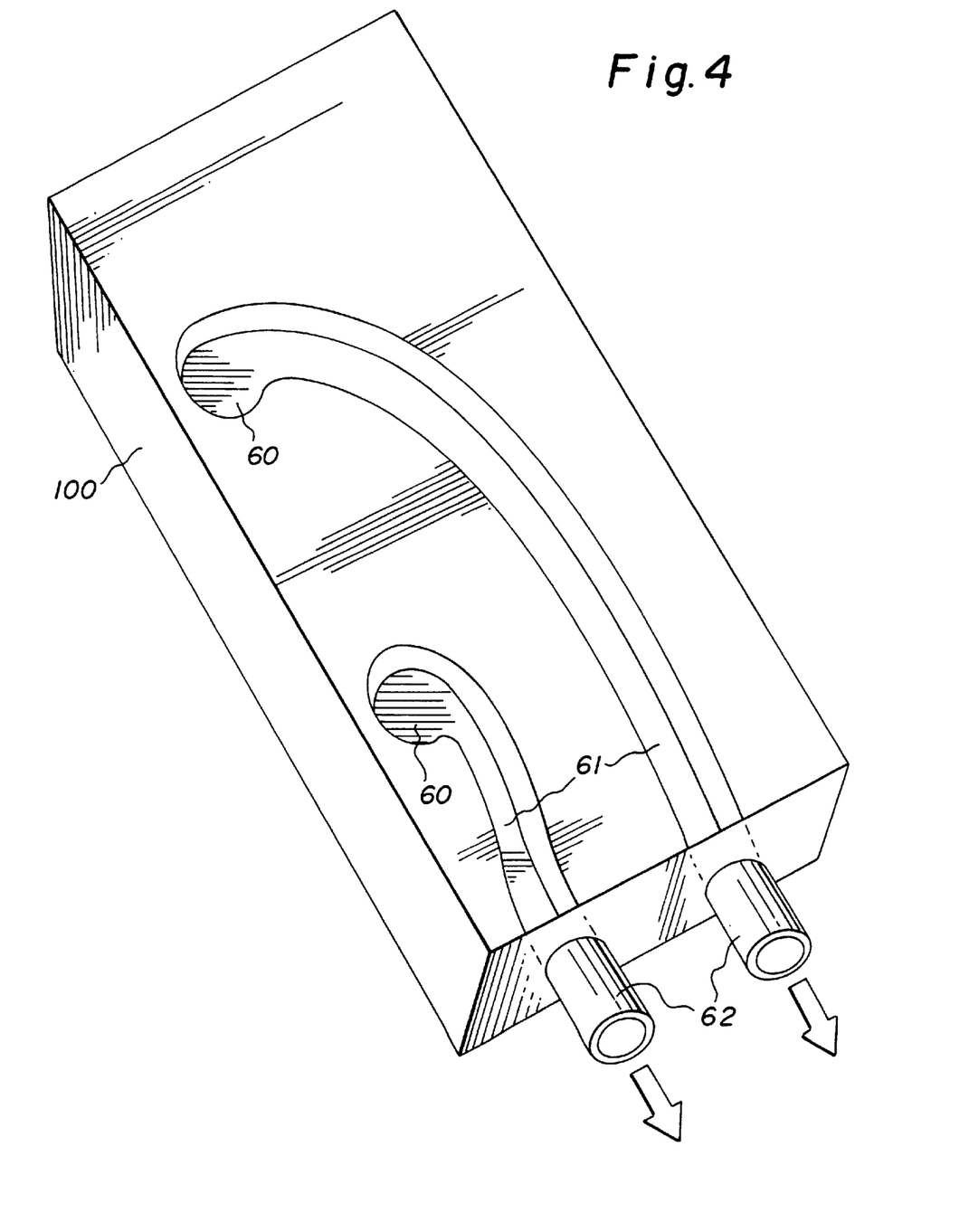
FIG. 4 is a perspective of the third layer of the integrated micro-ceramic chemical plant showing chambers for retrieving the reaction products and also an arrangement for discharging the reaction products out of the micro-ceramic chemical plant.

FIG. 4 shows that the third ceramic layer 100 includes receiving chambers 60 disposed directly below the discharge holes 37 in the second ceramic layer 30. The receiving chambers 60 receives liquid chemical reaction products and discharges these reaction products out of the integrated micro-ceramic chemical plant 10 through outlet tubes/conduits 62 via discharge channels 61.

Figure 5:
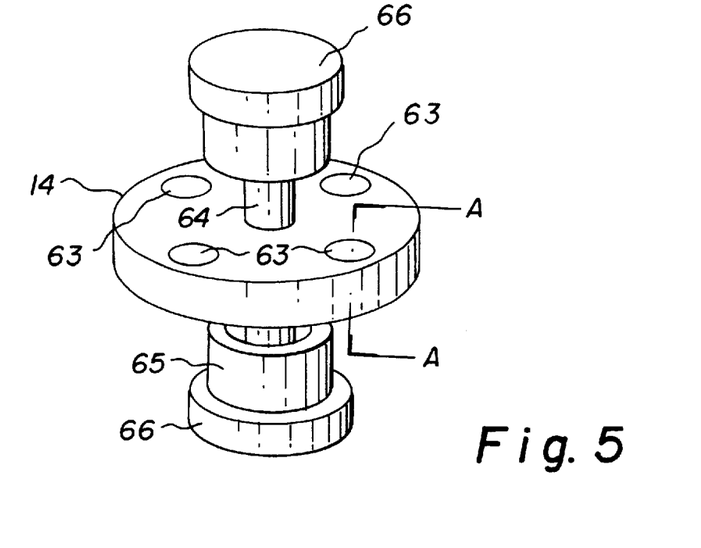

FIG. 5 shows a perspective of the rotatable member 14 which can be used in accordance with the present invention. The rotatable member 14 is formed with a plurality of cavities 63 and is fixedly secured to a shaft 64 which is rotated by a motor 65. Appropriate end caps with bearings 66 are provided on opposite ends of the shaft 64.

A difference between the micro-filters and the catalytic reaction beds is that the micro-pores in the filters is of interconnecting type whereas in the catalytic reaction beds the micro-pores are of non interconnecting type. Since the micro-pores of the catalytic reaction beds are of non interconnecting type, micro-channels are incorporated in the micro-ceramic catalytic reaction beds for passage of the reactants and the reaction products from the top surfaces to the bottom of the catalytic reaction beds. A spiral arrangement micro-channel is considered to be most efficient in such a situation, because in such an arrangement of micro-channel, the largest area of catalytically active surface will be exposed to the chemical reactants for efficient catalyst assisted chemical reactions.

Figure 6A:
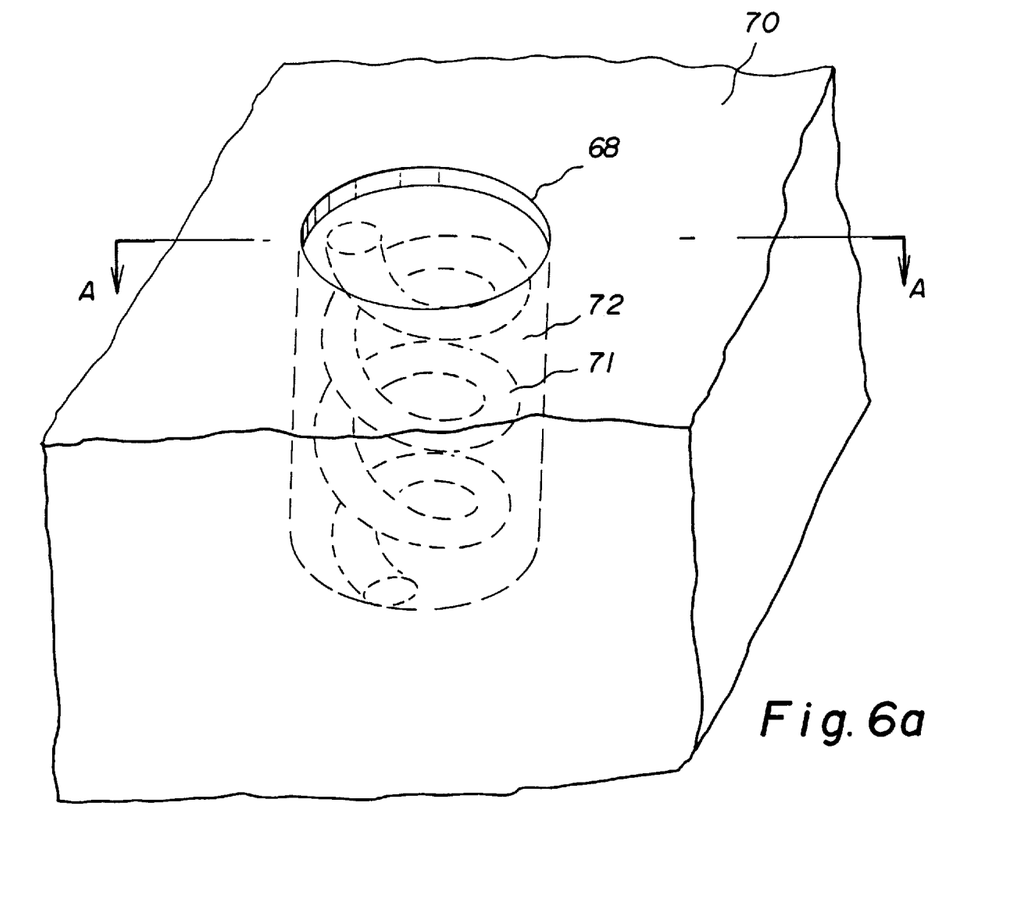
FIG. 6a is a perspective of a micro-ceramic catalytic reaction bed showing a typical arrangement of a spiral micro-channel.

FIG. 6a shows a perspective of a micro-ceramic catalytic reaction bed 68 within a portion 70 of cavities of the rotatable member 63 indicating a typical arrangement of a spiral micro-channel 71 within a non-interconnecting micro-porous region 72 of the catalytic reaction bed.

Figure 6B:
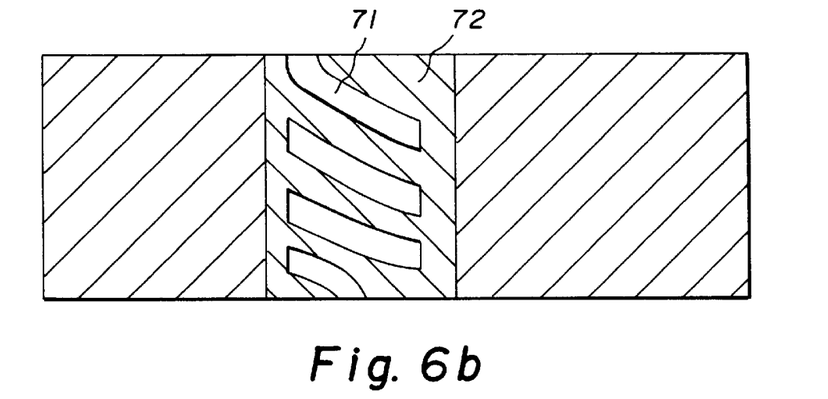
FIG. 6b is a cross-sectional view taken along lines A—A of FIG. 6a showing a micro-ceramic catalytic reaction bed.
Figure 6C:
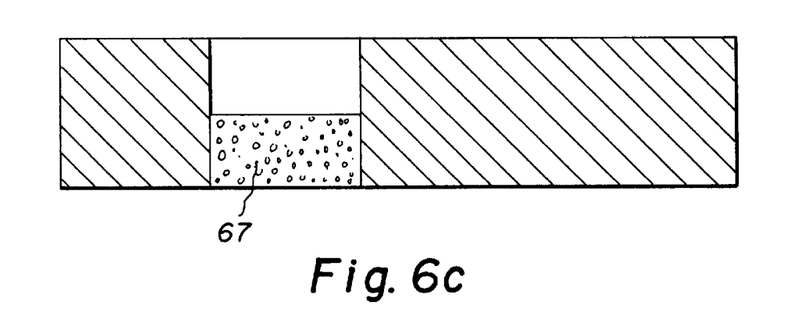
FIG. 6c is a cross-sectional view taken along the line A—A of FIG. 5 showing a micro-filter.
Figure 6D:
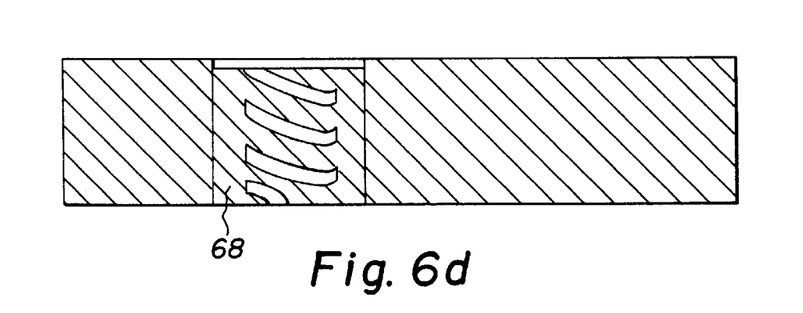
FIG. 6d is a cross-sectional view taken along the line A—A of FIG. 5 showing a micro-ceramic catalytic reaction bed.
Figure 6E:
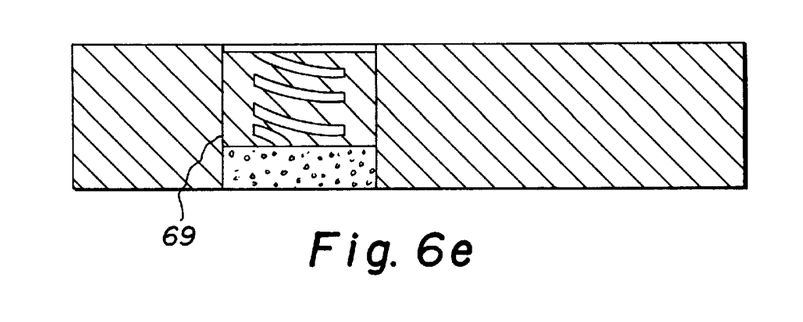
FIG. 6e is a cross-sectional view taken along the line A—A of FIG. 5 showing a combination of micro-ceramic catalytic reaction bed and micro-filter.

FIG. 6b shows a cross-sectional view along lines A—A of micro-ceramic catalytic reaction bed 68 of FIG. 6a depicting the spiral micro-channel 71 and the non-interconnecting micro-porous region 72.

FIGS. 6c, 6d and 6e show cross-sectional views along lines A—A of the rotatable member 14 of FIG. 5 showing the arrangements of a micro-filter 67, a micro-ceramic catalytic reaction bed 68, and a micro-ceramic catalytic reaction bed with micro-filter respectively. The rotatable member 14 is designed in such a manner that either a micro-filter 67 or a micro-ceramic catalytic reaction bed 68 or a combination of micro-ceramic catalytic reaction bed and a micro-filter arrangement 69 can be positioned underneath the discharge hole 37 of the second ceramic layer 30.

Referring once again to FIG. 3a, the embedded heating elements 40 can be made from ceramic materials such as $MoSi_2$, $TiB_2$ or $ZrB_2$, $WO_3$ or high temperature metallic alloys such as Nichrome (Ni—Cr alloys used commercially as heating elements), and refractory metals such as Mo. The electrical leads 41 for the heating elements 40 are located at the side of the ceramic plate and is an integral part of it. In order to monitor and control the temperature, a feed-through 42 which extends up to the wall of the chamber is provided which protrudes at an angle from outside to the surface of the second ceramic layer 30. A thermocouple can be introduced through the feedthrough to measure as well as control the temperature. This thermocouple (not shown) is connected through a feed back control system to the heater power supply.

Figure 7:
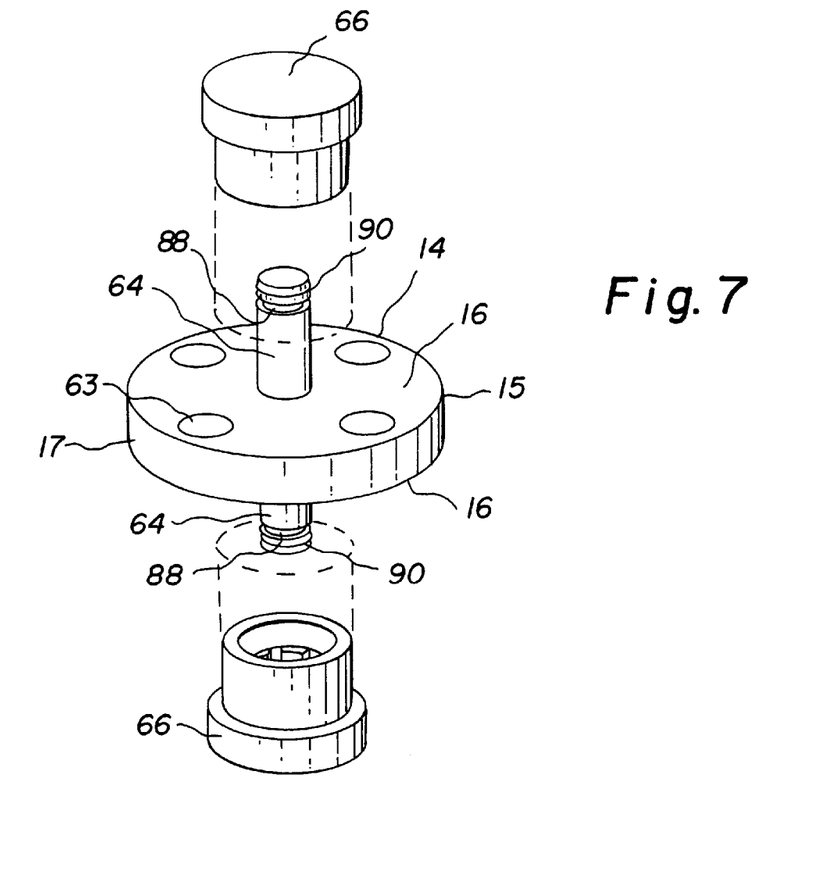
FIG. 7 is an exploded perspective of a micro-filter member and end caps.

Referring to FIG. 7, an exploded perspective is shown of a rotatable member 14, and end caps with bearings 66. The rotatable member 14 includes a rotatable disk 15 having disk surfaces 16 and 17, and shaft 64 with threaded grooves 88 and having ridges 90. Each end cap with bearing 66 has a shaft receiving cavity 210 (see FIG. 8) and is pressed onto shaft 64 as will be described.

Figure 8:
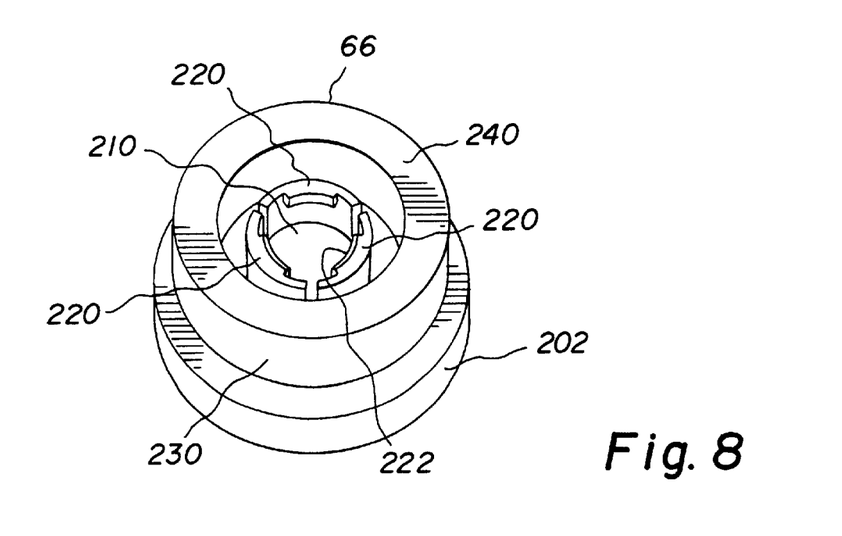
FIG. 8 is a perspective showing in more detail an end cap of FIG. 7.

Referring to FIG. 8, is a perspective in more detail of one of the end caps with bearings 66. This figure does not illustrate the bearing arrangement. The end cap 66 has a top portion 202, a shaft receiving cavity 210 which is formed by three flexible, spaced-apart support members 220 each of which has a lip portion 222, and a circular support wall 230 with a ridge portion 240. The end cap 66 is mounted to shaft 64 of rotatable member 14 by inserting shaft 64 into the shaft receiving cavity 210. During the insertion of shaft 64 into the shaft receiving cavity 210, as the shaft 64 initially enters the shaft receiving cavity 210 it forces apart support members 220 of end cap 66 when the lip portions 222 engage ridge 90 of shaft 64. Once the lip portions 222 pass over ridge 90 of shaft 64, the support members 220 return to their unflexed positions with the lip portions 222 locked into the threaded groove 88 of shaft 64 thereby fixing the end cap 66 to the shaft 64. The end cap 66 is removed from the shaft 64 by pulling it off thereby reversing the attachment process.

Figure 9A:
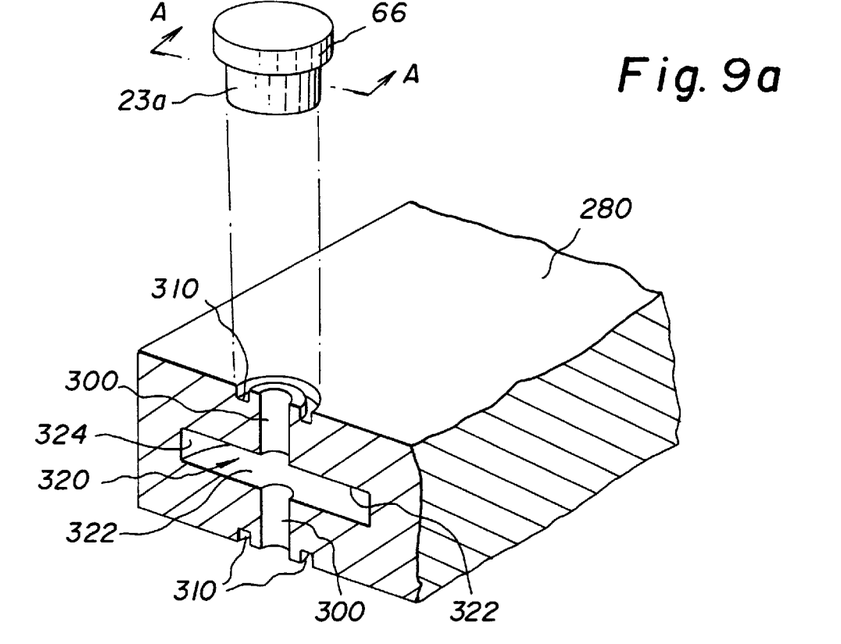
FIG. 9a is an exploded cross-sectional perspective showing in more detail a portion of the chemical plant and an end cap.

Referring to FIG. 9a, an exploded cross-sectional perspective is shown of a portion of integrated micro-ceramic chemical plant 280 and end cap 66. The portion of integrated micro-ceramic chemical plant 280 comprises recesses 300, grooves 310 and a rotatable member receiving cavity 320. The rotatable member receiving cavity 320 which has top and bottom surfaces 322 and side surfaces 324. These surfaces define the rotatable member receiving cavity 320 for receiving a portion of the rotatable disk 15 of rotatable member 14.

Figure 9B:
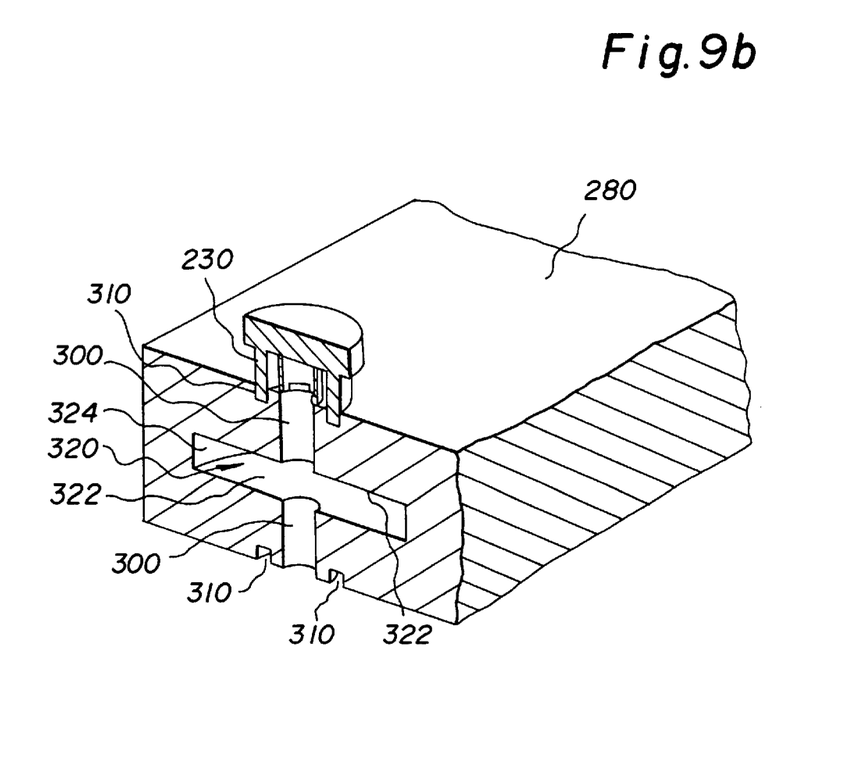

Referring to FIG. 9b, a cross-sectional perspective is shown of the end cap 66 mounted to the portion of integrated micro-ceramic chemical plant 280. Specifically, the end cap 66 is shown in a cross sectional view taken along line A—A in FIG. 9a. It is instructive to note that the end cap 66 is mounted to the portion of integrated micro-ceramic chemical plant 280 by inserting the circular support wall 230 of end cap 66 in circular groove 310 of the integrated micro-ceramic chemical plant 280.

Figure 10:
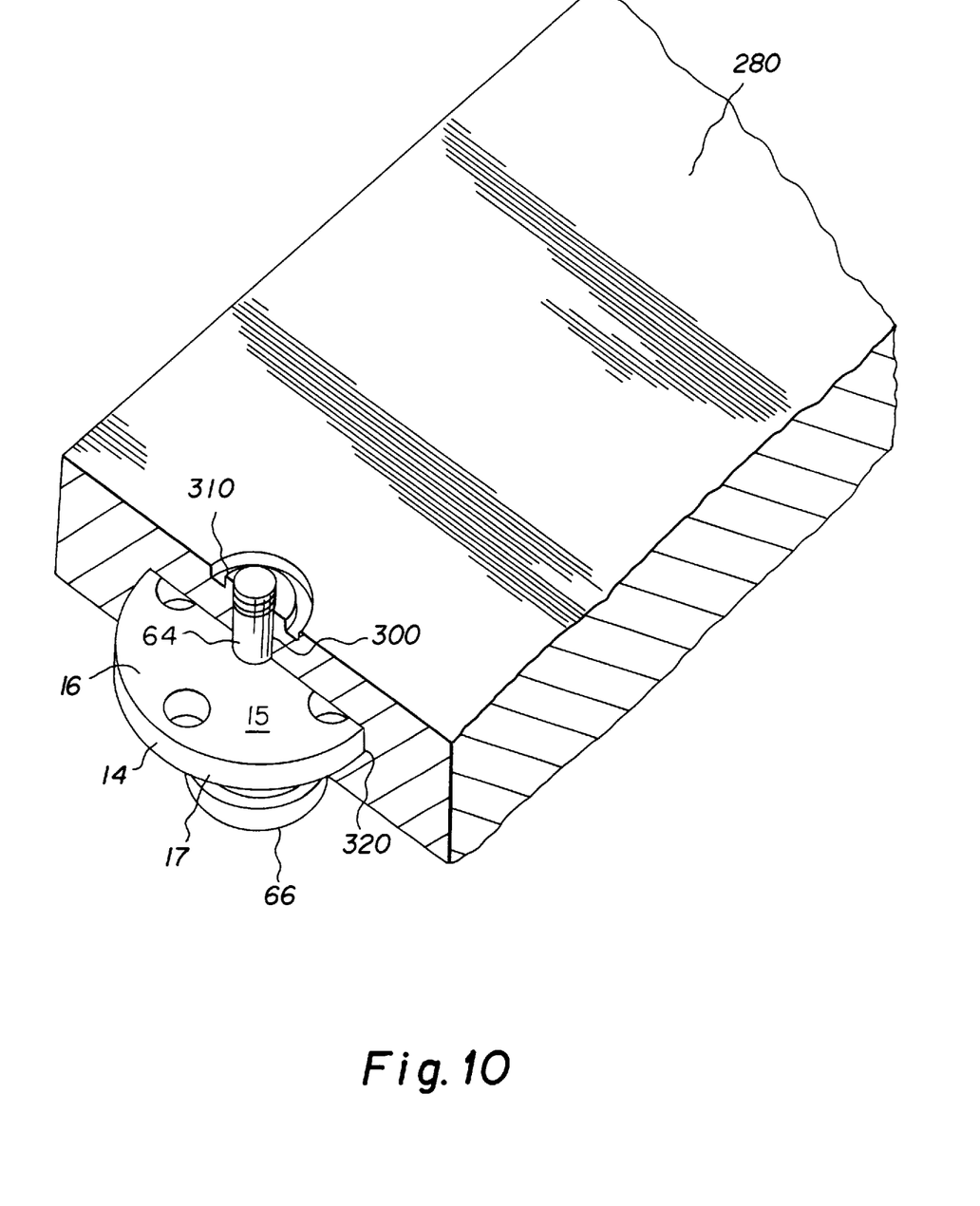
FIG. 10 is a perspective showing the rotatable member mounted to the integrated micro-ceramic chemical plant.

Referring to FIG. 10, the rotatable member 14 is mounted to a portion of integrated micro-ceramic chemical plant 280. Specifically, a portion of the rotatable disk 15 of rotatable member 14 (see FIG. 7) is inserted into the rotatable member receiving cavity 320 of the portion of integrated micro-ceramic chemical plant 280. Portions of the disk surfaces 16 and 17 are in contact with the surfaces 322 and 324, respectively of rotatable member receiving cavity 320 (see FIG. 9a). It should be noted that the disk surfaces 16 an 17 and the surfaces 322 and 324 of rotatable member receiving cavity 320 are smooth, nonporous, and wear and abrasion resistant. Therefore the surfaces in contact with one another can be slideably moved with respect to one another without causing degradation to either surface. Moreover, the rotatable member receiving cavity 320 is designed to provide a tight fit for the portion of the rotatable disk 15 inserted into it, so as to preclude fluid from the chemical plant from seeping between the disk surfaces 16 an 17 and the surfaces 322 and 324 of rotatable member receiving cavity 320, when they are in respective contact with one another.

The shaft 64 of rotatable member 14 is in contact with, and supported by recesses 300 in the portion of integrated micro-ceramic chemical plant 280. The end cap 66 is pressed onto shaft 64 as described in the description of FIG. 8. The end cap 66 is mounted to the portion of integrated micro-ceramic chemical plant 280 with its circular support wall 230 inserted into groove 310 as described in FIG. 9b. To complete the mounting of rotatable member 14 to the portion of integrated micro-ceramic chemical plant 280, an additional end cap 66 is pressed onto shaft 64 and concurrently mounted to the portion of chemical plant 280 by inserting its circular support wall 230 into groove 310. In this way the rotatable member 14 is fixedly attached to the portion of integrated micro-ceramic chemical plant 280.

The present invention involves an integrated micro-ceramic chemical plant. When the term "micro" is used it refers to the fact that the features within the chemical plant have dimensions of about 100 micrometers or less. The unitary ceramic block 10 is formed by multiple ceramic layers in the "green" state which are sintered together. These layers can typically have dimensions 10 to 100 mm wide, 10 to 100 mm long, and 1 to 10 mm thick.

The use of the term "green" means that when particulate ceramic powder, preferably mixed with an organic binder is subjected to uniform compacting forces in order to provide an unsintered preform which has uniform density. One particular effective material is a tetragonal zirconia ceramic powder that can be micromolded to form the layers by standard methods such as injection molding, gel casting, tape casting, dry pressing or cold isostatic pressing with "green" machining. Other ceramic materials which can be used are $Al_2O_3$, AlN, BN, MgO, $Al_2O_3$—$ZrO_2$ composite, SiC, $Si_3N_4$ and other oxide and non-oxide ceramics and their composites thereof.

The features within each layer such as chambers, channels and passageways can be formed as follows:
(a) features like feed-through, through-holes, mixing chambers and catalytic reaction chambers can be formed in each layer in the "green", state by incorporating those features in the mold and replicating those features in the "green" body. Approximately, 20% to 50% larger sized features (depending on the ceramic materials to be used for manufacture of the integrated micro-ceramic chemical plant) must be made to account for shrinkage during sintering. The amount of shrinkage largely depends on the relative amount of organic binders in the ceramic mixture. Typically, 2% to 5% by weight organic binders are added to the fine ceramic or ceramic composite powders for powder consolidation processes such as cold isostatic pressing and dry pressing. On the other hand, 10% to 40% by weight organic binders are used for consolidation processes such as gel casting, tape casting and injection molding. The details of compacting procedures and replicating of micro features are known in the prior art.
(b) features like embedded coils and heating coils can be formed by placing sacrificial members comprising organic polymers which are burned away during the sintering process. The details of forming embedded microfeatures are described in the commonly assigned U.S. patent application Ser. No. 08/775,523, filed Jan. 2, 1997, entitled "Miniature Molded Ceramic Devices Having Embedded Spiral Coils" by Chatterjee et al, and commonly assigned U.S. patent application Ser. No. 08/775,524, filed Jan. 2, 1997, entitled "Method for Forming Molded Ceramic Devices Having Embedded Spiral Coils" by Chatterjee et al which are incorporated herein by reference.
(c) features like microchannels can be formed by embedding organic sacrificial member which burn away during sintering or can be incorporated in the molding tools for pressure assisted replication on the "green" ceramic bodies.

During the sintering process which is the final stage of the manufacturing process of the micro-ceramic chemical plant the "green" ceramic layers shrink due to the burning of the binders and also due to the consolidation of the ceramic and its composite powders. Provision must be made to compensate for this shrinkage by appropriately enlarging the features in the tools, such as dies and molds, used for replicating such features in the "green" parts.

As shown in FIG. 7, the rotatable member 14 includes cavities 63. These cavities 63 can contain micro-filter, micro-ceramic catalytic reaction bed, and micro-ceramic catalytic reaction bed with micro-filter 67, 68 and 69. (see FIGS. 6c, 6d and 6e). The rotatable member 14 in the form of a disk can be formed as follows:
a) rotatable member shown as a disk 15 (FIG. 7) and the shaft 64 (FIG. 7) on which it is mounted can be formed individually by cold pressing ceramic powders in a die and mold assembly forming "green" ceramic bodies and subsequently sintering those to a high temperature to form dense ceramic parts. The features such as a central cavity for receiving the shaft and other cavities for incorporating micro-filter, micro-ceramic catalytic reaction bed and the combination of micro-ceramic catalytic reaction bed and micro-filter can be incorporated in the mold or die assembly. The mold or die assembly replicates those features in the "green" ceramic bodies. A fully dense, sintered shaft member is subsequently shrink fitted or press fitted on to the central cavity of the rotatable disk 15. Alternative processes of manufacturing such as injection molding, cold isostatic pressing in conjunction with "green" machining, gel casting and subsequent sintering can also be adopted for forming the rotatable member. In such cases, the rotatable disk 15 and its shaft 64 can be made as a single unit. Well characterized fine ceramic or ceramic composite powder with appropriate amount of binders is preferably used for consolidation in the above mentioned manufacturing processes. A preferred material and manufacturing process for forming the rotatable member assembly is fully stabilized zirconia alloy powders and cold pressing of these powders with subsequent sintering of the cold pressed "green" ceramic bodies. This forming process produces a 'net shape' rotatable member and the details of the manufacturing steps are described by Ghosh et al in commonly assigned U.S. Pat. No. 5,411,690, which is incorporated herein by reference.

b) micro-filters 67 which preferably are micro-porous ceramics are produced by mixing different sizes of polymeric fibers with the ceramic powders. An essential requirement of micro-filter materials is that the pores should be of interconnecting variety. In the ceramic powder/polymeric fiber mix, the fibers can overlay on each other in a plurality of orientations. The ceramic powder/polymeric fiber mix is cold pressed in disk form corresponding to the shape of the cavities of the rotatable disk 15. These cold pressed disks can be subsequently sintered and the individual disks can be either press fitted or shrink fitted onto the individual cavities of the rotatable member. Alternatively, the ceramic powder/polymeric mix can also be placed in the specific areas of the cavities of the rotatable member in the mold/die assembly in the manufacture of the rotatable member (see the process described in (a) above) and pressed before subsequent sintering. During the sintering process, the polymeric fibers burn off, leaving porosities. Since the fibers overlap each other, the porosities thus created are interconnecting in nature. The pore densities and the sizes and shapes of the pores can be varied by appropriate choices of the amount and the type of polymeric fibers. The polymeric fibers include fibers made from polyvinyl alcohol, polyethylene glycol, acrylic, or from any organic compound which burns in air without leaving any residue. A wide range of fiber size (diameter and length) can be chosen for forming the micro filters. The typical diameter can range from 0.1 to 15 $\mu$m and the length ranges from 1 to 25 $\mu$m. It should be noted that the design should accommodate the approximately 20 to 50 percent larger sized features (such as size of the micro filter disks and also the size of the pores) depending on the ceramic material used, to account for shrinkage during sintering. The preferred materials for forming the micro filter disks are fully stabilized zirconia, zirconia—alumina composites, zirconia silicate, alumina silicate and other oxide and non-oxide ceramics and their composites.

c) micro-ceramic catalytic reaction bed 68 according to the present invention is a micro-porous ceramics impregnated with catalysts. However, the porosity of these ceramics are of the non-interconnecting variety. In the catalyst preparation methods preparation of a properly designed micro-ceramic catalytic reaction bed plays a very important role. The micro-pores in the catalytic reaction bed accept the catalysts and serve as housing for the catalysts. The micro-pores have greater pore surface areas per unit volume of the pores and from geometrical considerations, if the pores are spherical in nature, large surface areas can be achieved. The micro-ceramic catalytic reaction bed can be formed by thoroughly mixing ceramic or composite powders with finely dispersed spherical polymeric beads and cold pressing the mixture in a die/mold assembly before sintering at a high temperature. The pressure and temperature for cold pressing and sintering can vary depending on the ceramic material chosen for manufacture of micro-ceramic catalytic reaction beds. As has been described earlier, the micro-pores of the catalytic reaction beds are of non interconnecting type. Although the preferred nature of pores for use as support for various catalyst, this type of pores pose problems in the movement of both the reactants and the reaction products through the catalytic reaction bed. In order to alleviate this problem, micro-channels are incorporated in the micro-ceramic catalytic reaction beds for passage of the reactants and the reaction products from the top surfaces to the bottom of the catalytic reaction beds. A spiral arrangement microchannel is highly efficient in such situation, because in such an arrangement large areas of the catalytically active surface will be exposed to the chemical reactants for efficient catalyst assisted chemical reactions. A spiral micro-channel within the micro-ceramic catalytic reaction bed can readily be formed by placing a sacrificial polymeric fiber formed in the form of a coil in a suitable location in the die/mold assembly. The die/mold assembly is filled with a thoroughly mixed charge of ceramic or composite powder with finely dispersed spherical powder before cold pressing and sintering. More than one sacrificial polymeric fiber coils can be used for forming multiple spiral channels within a micro-ceramic catalytic reaction bed. Care should be taken in making sure that the terminal ends of each polymeric fiber coil terminates at the top and bottom surfaces of the "green" micro-ceramic catalytic reaction bed. During the sintering process, the sacrificial polymeric fiber coil burn off leaving a spiral micro-channel. A preferred ceramic material for use in forming micro-ceramic catalytic reaction beds is fully stabilized tetragonal zirconia alloy, although materials such as zirconia—alumina composites, zirconia silicate, alumina silicate and other oxide and non-oxide ceramics and their composites can be used to form such beds. The manufacturing processes such as cold isostatic pressing with "green" machining, injection molding, gel casting of ceramic powder/polymeric bead mixture with sacrificial polymeric fibers can also be adopted for forming the micro-ceramic catalytic reaction beds with micro-channels. The micro-ceramic catalytic reaction beds can be formed separately and later can be incorporated in the micro-chemical plant by either press fitting or by shrink fitting. Alternatively, it can also be manufactured along with the rotatable member assembly. The catalyst preparation technique involves two stages. First, preparing a suitable micro-ceramic catalytic reaction bed and secondly, laying a metal salt component into a finely divided form on the bed, generally micro-porous ceramics and converting the supported metal salt to a metallic or oxide state. The dispersion of the metal salt is achieved by impregnation, adsorption from solution, co-precipitation, or deposition, while the conversion of the metal salt to a metallic or oxide state is achieved either by calcination or by reduction. Essentially all the techniques of catalyst preparation reduce to two simple steps: dispersing the active material in a fluid or gaseous form and immobilizing this dispersed material as it is reconverted to an insoluble solid form. The primary aim of applying a catalytically active component to a micro-porous micro-ceramic catalytic reaction bed is to obtain the catalyst in a highly dispersed form. A properly designed catalyst should have the essential attributes of activity, stability, selectivity, and regenerability. These can be related to the physical and chemical properties of the catalyst, which in turn can be related to the variable parameters inherent in the method used for the preparation of the catalyst.

d) individual components of micro-ceramic catalytic reaction bed and the micro-filter combination 69 of this invention can be formed separately by the processes described above and either shrink or press fitted onto the cavities of the rotatable member 63. Alternatively, the porosities in the micro-ceramic unitary member can be varied in a functionally gradient manner in such a fashion that the top portion of the unitary micro-ceramic member contain predominantly non-interconnecting porosity, whereas the bottom portion of the member contain predominantly interconnecting porosity. The top portion also contain spiral micro-channels as described earlier is impregnated with catalysts.

The invention has been described in detail with particular reference to certain preferred embodiments thereof, but it will be understood that variations and modifications can be effected within the spirit and scope of the invention.

PARTS LIST 10 integrated micro-ceramic chemical plant
12 inlet tubes/conduits
13 through-holes
14 rotatable member
15 rotatable disk
16 disk surfaces (top and bottom)
17 disk surface (side)
20 first ceramic layer
30 second ceramic layer
34 chemical delivery chamber
35 chemical mixing chamber
36 receiving chambers with holding tanks
37 discharge holes
38 reaction/catalytic reaction chamber
39 catalytic reaction bed
40 embedded heating elements
41 electrical leads for heater
42 thermocouple feedthrough
60 receiving chambers
61 discharge channels
62 outlet tubes/conduits
63 cavities of the rotatable member
64 shaft
65 motor
66 endcaps with bearings
67 micro-filter
68 micro-ceramic catalytic reaction bed
69 micro-ceramic catalytic reaction bed with micro-filter
70 portion of cavities of the rotatable member
Parts List cont'd
71 spiral micro-channel
72 non-interconnecting micro-porous region
88 threaded grooves
90 ridges
100 third ceramic layer
202 top portion of end cap
210 shaft receiving cavity of end cap
220 support members of end cap
222 lip portion of end cap
230 circular support wall of end cap
240 ridge portion of end cap
280 portion of integrated micro-ceramic chemical plant
300 recess
310 circular grooves
320 rotatable member receiving cavity
322 surfaces (top and bottom) of rotatable member receiving cavity
324 surfaces (side) of rotatable member receiving cavity

What is claimed is:

1. An integrated micro-ceramic chemical plant having a unitary ceramic body formed from multiple ceramic layers in the "green" state which are sintered together comprising:
   (a) the unitary ceramic body defining a reaction chamber and first passage means for providing communication with the reaction chamber so that two or more fluids may be delivered to such reaction chamber for reaction;
   (b) the unitary ceramic body defining a receiving cavity connected to the reaction chamber;
   (c) a movable member insertable into the receiving cavity and having a plurality of micro-filters having interconnecting porosity for separating the reaction products so as to retrieve desired reaction products; and
   (d) means for moving the movable member to a position where one of the micro filters is in communication with the reaction chamber for separating the reaction products.

2. The integrated micro-ceramic chemical plant of claim 1 wherein the movable member is in the form of a disk which is adapted to be rotated into the receiving cavity.

3. The integrated micro-ceramic chemical plant of claim 1 including first and second passage means which are selected to have a circular, oval, triangular, or rectangular cross-section.

4. The integrated micro-ceramic chemical plant of claim 1 wherein the micro-filters are made by dry pressing zirconia silicate or alumina silicate at a varying pressure such that upon sintering a varying degree of porosity is achieved.

5. The integrated micro-ceramic chemical plant of claim 1 wherein the micro-filters are made by gel casting, tape casting and injection molding zirconia silicate or alumina silicate such that upon controlled sintering a varying degree of porosity is achieved.

6. The integrated micro-ceramic chemical plant of claim 1 wherein the micro-filters are made by dry pressing a silicate at a pressure such that upon sintering at a varying temperature a variable degree of porosity is achieved.

7. The integrated micro-ceramic chemical plant of claim 1 wherein the micro-filters are zirconia, alumina, silicon carbide, silicon nitride and ceramic composites comprising zirconia—alumina.

8. The integrated micro-ceramic chemical plant of claim 1 wherein the micro-filters are formed by mixing with sacrificial organic fibers which upon compacting and subsequent firing a variable degree of interconnecting porosity is achieved.

* * * * *